Jan. 27, 1970 H. KOCH ET AL 3,492,438
SYSTEM FOR THE INDUCTIVE TRANSMISSION OF MESSAGE TO
VEHICLES EQUIPPED WITH RECEIVERS
Filed April 13, 1967 2 Sheets-Sheet 1

INVENTORS:
Harry Koch
Klaus Holetzeck
Fritz Franke
BY Spencer & Kaye
Attorneys

INVENTORS:
Harry Koch
Klaus Holetzeck
Fritz Franke
BY Spencer & Kaye
Attorneys

United States Patent Office 3,492,438

Patented Jan. 27, 1970

3,492,438

SYSTEM FOR THE INDUCTIVE TRANSMISSION OF MESSAGE TO VEHICLES EQUIPPED WITH RECEIVERS

Harry Koch, Kleinburgwedel, uber Hann, and Klaus Holetzeck and Fritz Franke, Hannover, Germany, assignors to Telefunken Patentverwertungsgesellschaft m.b.H., Ulm (Danube), Germany Filed Apr. 13, 1967, Ser. No. 630,576
Claims priority, application Germany, May 11, 1966, T 31,140; Nov. 19, 1966, T 32,544
Int. Cl. H04b 5/02
U.S. Cl. 179—82 3 Claims

ABSTRACT OF THE DISCLOSURE

A system for the inductive transmission of messages to vehicles equipped with receivers comprises along each carriage way main induction loops for the message transmission and ahead of each main loop, seen in the direction of travel, an advance or trigger induction loop for the transmission of signals to switch on the receiver. Each advance loop is located so near to the associated message loop that signals from both loops are present in the region between the loops and the receiver is primed by receiving a signal from the advance loop and is switched on by the simultaneous reception of signals from both loops.

This invention relates to traffic control systems which comprise induction loops which extend along the roadway and the signals of which can be picked up by receivers present in the vehicles. In such systems it is important to ensure that only vehicles travelling in the one direction receive the messages issued for this direction of travel and that vehicles travelling in the opposite direction are prevented from being able to receive these messages.

In order to solve this problem, it has been proposed (U.S. specifications 3,101,394 and 3,105,119) to provide an advance loop, called trigger signal transmitting loop, ahead of the main loop, called message signal transmitting loop, and to provide means in each receiver which switch the receiver on automatically only on reception of the signal from the advance loop and hold it switched on while the signals from the main loop are being received. The main loops for each direction of travel have to be staggered in relation to one another in the direction of travel.

In such systems it may happen, however, that the receiver in a vehicle proceeding along a carriage way in one direction is switched on by a trigger signal transmitted from the advance loop associated with the carriage way for the other direction of travel. In this case the messages from the main loop associated with the other carriage way many kilometres ahead would be received, which is undesirable. In order to avoid this difficulty, it is proposed in the U.S. specifications hereinbefore mentioned to provide additional means which, after a certain time, automatically switch off the receiver again which has been switched on by the trigger signal from the advance loop associated with the other travel direction.

Such means may, however, have a considerable disadvantage for the reception on one's own carriageway. In a traffic jam, it may occur that vehicles are between the advance loop and the main loop on their own carriage way and have to travel very slowly or even have to stop there. Then it may happen that the receiver which has been switched on by the advance loop, has been switched off again before reaching the main loop and, as a result, the messages from the main loop are not received. A separate switch could, of course, be provided on the receiver which could be operated by the driver in such a case, but its operation might easily be forgotten.

It is the object of the invention to avoid the said undesirable effect due to traffic jams. The invention consists in that the advance loop is situated so close to the main loop that the signals of both loops are present in the space between the two loops, and that the receivers are so designed that on reception of the signal from the advance loop, the switching on of the receiver is only prepared and the receiver is only switched on completely on the additional reception of the signal from the main loop.

Figure 1:
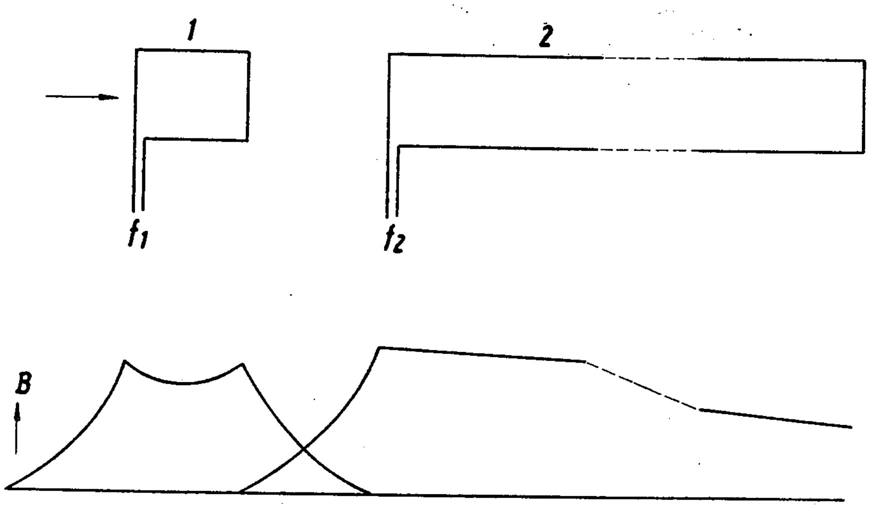
Figure 2:
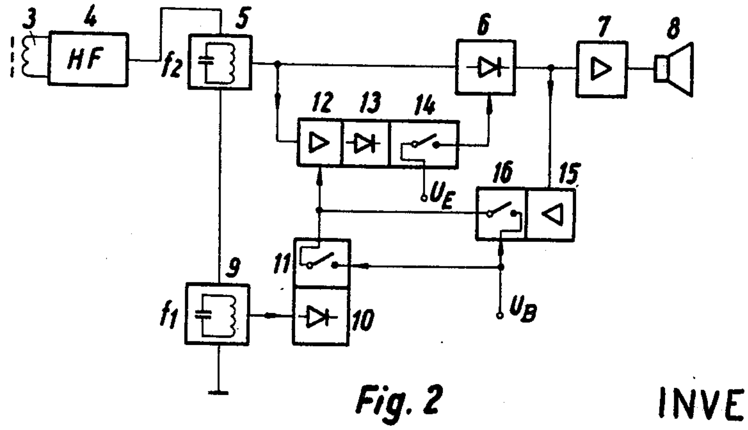
Figure 3:
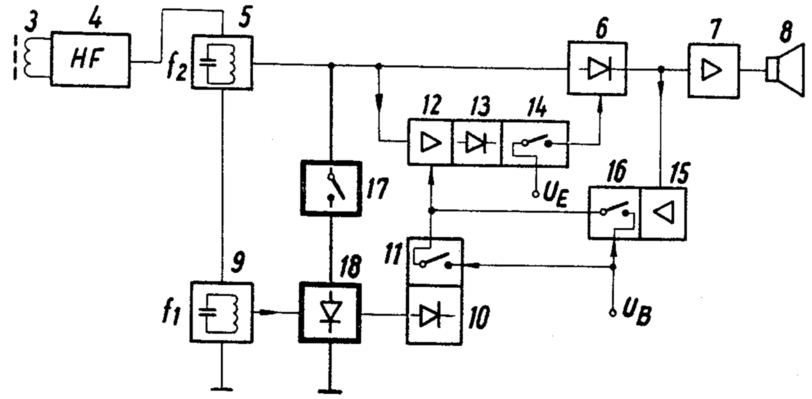

In order that the invention may be clearly understood, it will now be described in more detail with reference to the accompanying drawings wherein FIGURE 1 indicates diagrammatically an advance loop and a main loop and the associated field distributions, FIGURE 2 is a block circuit diagram of an example of a receiver according to the invention, and FIGURE 3 shows a modification of the receiver shown in FIGURE 2.

In FIGURE 1, the direction of travel is indicated by an arrow at the top left. An advance loop 1, having a length of 10 m. for example, is followed after an interval of likewise 10 m. for example. by a main loop 2 which has for example a length of 3 km. The advance loop 1 is fed at the frequency $f_1$ of 85 k.c.p.s. for example and the loop 2 at a frequency of $f_2$ of 70 k.c.p.s. for example. The curves forming the lower part of FIGURE 1 show the magnetic field strength B along the roadway. It can be seen that both fields are present in the region between the two loops 1 and 2 and at the same strength substantially in the middle. The switching means in the receiver are designed in such a manner that during travel over the advance loop 1, the frequency $f_1$ prepares the switching on of the receiver and then, substantially in the middle between the two loops, the receiver is switched on completely by the addition of the frequency $f_2$, while the frequency $f_2$ alone cannot switch on the receiver either preparatorily or completely.

The block circuit diagram of a receiver in FIGURE 2 shows that the oscillations received by the ferrite aerial 3 are amplified in the selective high-frequency amplifier 4. The bandwidth of the high-frequency amplifier 4 is so wide that, apart from the main-loop frequency $f_2$, the advance-loop frequency $f_1$ is also allowed to pass although much more weakly. In order to compensate for the attenuation, the frequency $f_1$ is transmitted at a transmission level which is substantially ten times higher so that the voltages for the frequencies $f_2$ and $f_1$ respectively are substantially equal at the two oscillatory circuits 5 and 9 which are connected to the output of the high-frequency amplifier 4. The frequency $f_2$, which serves as a carrier frequency for the messages, is demodulated in the demodulator 6. The low-frequency voltage is then amplified in the amplifier 7 and supplied to the loudspeaker 8.

Now follows the description of the auxiliary devices in the receiver which serve for switching the receiver on and off. The high-frequency section 4 always remains in operation. In this example, only the demodulator 6 is switched on and off. Thus the low-frequency amplifier 7 also remains permanently in operation. In the normal condition, the demodulator 6 is blocked.

A voltage at the frequency $f_1$ appears at the oscillatory circuit 9 during travel over the advance loop 1. It is rectified in the rectifier 10, and the so obtained direct voltage closes an electronic switch 11 (for example a monostable trigger circuit) which supplies the operating voltage $U_B$ to the amplifier 12 during the reception of the frequency $f_1$. The switching on of the receiver is thus prepared.

In the area between the advance loop and the main loop, the frequency $f_2$ is added. It is branched off from the transmission channel and supplied to the amplifier 12 which receives its operating voltage during the reception of the frequency $f_1$. The frequency $f_2$, which is amplified in the amplifier 12, is then rectified in the rectifier 13. The direct voltage received closes an electronic switch 14 as a result of which the unblocking voltage $U_E$ is supplied to the demodulator 6. As a result, the demodulation of the frequency $f_2$ modulated with the messages is rendered possible. During the demodulation, a direct voltage is obtained apart from the message is amplified in the amplifier 15 and actuates an electronic switch 16 which supplies the operating voltage $U_B$ to the amplifier 12. Through this holding circuit, the amplifier 12 is maintained in operation even when the frequency $f_1$ of the advance loop has disappeared during travel over the main loop. If the frequency $f_2$ also disappears at the end of the main loop, the holding circuit 15, 16 is de-energized as a result of which the amplifier 12 is blocked. Thus the unblocking of the demodulator 6 is removed. The receiver is then no longer ready for reception and can only be switched on again by means of the frequencies $f_1$ and $f_2$.

IN FIGURE 3, the parts emphasised by thick lines are the parts added to the circuit shown in FIGURE 2. 17 designates an electronic switch (for example a trigger circuit in the form of a Schmitt trigger), while 18 is a damping device, for example a diode, which is rendered non-conducting by means of a bias voltage when the switch 17 is in the normal position. On the appearance of the main-loop frequency $f_2$, the switch 17 is changed over so that the bias voltage disappears at the diode and the diode becomes conducting as a result, and dampens the oscillatory circuit 9 to such an extent that the switch 11 does not respond. Thus the demodulator 6 is prevented from being unblocked on the simultaneous appearance of the frequencies $f_1$ and $f_2$ without the previous appearance of the advance-loop frequency $f_1$ alone.

The sensitivity of the switch 17 for the damping device 18 must be such that the switch 17 only closes when the holding circuit 15, 16 has already been closed during travel over one's own carriageway, in order that the receiver may receive messages from the main loop.

On travel over the opposite carriageway, the damping by the diode 18 should only be cancelled (by appropriate dimensioning of the switch 17) when there is a drop below the response sensitivity of the receiver so as to prevent fresh switching on when the frequencies $f_1$ and $f_2$ are present simultaneously.

What we claim as new and desire to secure by Letters Patent of the United States is:

1. A system for the transmission of messages to vehicles travelling on a roadway by means of induction loops extending along the roadway and receivers provided in the vehicles, wherein in each direction of travel an advance loop is provided ahead of each message transmitting loop, the distance between the two loops being such that signals from both loops are present in the region between the two loops, and wherein each receiver is so designed that, on the reception of the signal from the advance loop, the switching on of the receiver is only prepared, and the receiver is switched on only when the signal from the message loop is thereafter received simultaneously with the signal from the advance loop, received, and that the receiver is switched off, when the signal from the message loop ceases.

2. A system as claimed in claim 1, wherein the said receiver comprises means which derive a voltage from the signals from the message loop which voltage blocks the signal produced by the advance loop.

3. A system as claimed in claim 2, wherein the said means comprise a damping diode for the signal produced by the advance loop and a Schmitt trigger which is connected to the path carrying the message signal, the arrangement being made such that the Schmitt trigger, in its normal state, supplies a bias voltage to render the damping diode ineffective and that the Schmitt trigger, when its state is changed by the presence of a message signal, renders the damping diode effective so that the path for the signal from the advance loop is blocked.

References Cited

UNITED STATES PATENTS

| | | | |
|---|---|---|---|
| 3,105,120 | 9/1963 | Hanysz | 179—82 |
| 3,383,595 | 5/1968 | Obata | 325—64 |

KATHLEEN H. CLAFFY, Primary Examiner

W. A. HELVESTINE, Assistant Examiner